Nov. 10, 1942.   C. I. BRADFORD ET AL   2,301,193
MEASURING INSTRUMENT
Filed May 10, 1940

INVENTORS
Colin Irving Bradford
Paul E. Lowe
BY
D. Verner Smythe
ATTORNEY

Patented Nov. 10, 1942

2,301,193

UNITED STATES PATENT OFFICE 2,301,193

MEASURING INSTRUMENT

Colin Irving Bradford, Stratford, and Paul E. Lowe, Bridgeport, Conn., assignors to Remington Arms Company, Inc., a corporation of Delaware Application May 10, 1940, Serial No. 334,300

5 Claims. (Cl. 161—15)

This invention relates to an apparatus for measuring time intervals and particularly intervals that are extremely short, using a ballistic galvanometer or other instantaneous charge measuring device as the indicating instrument. Accurate measurement of short time intervals is desired and necessary in many precision devices. As an example, the measurement of the flight of a projectile through a barrel or externally of the barrel occupies a very short space of time. Accurate measurements of time intervals are also necessary in devices, such as instruments used for sounding purposes to determine the depth of the ocean.

As still further examples of the miscellaneous applications may be mentioned the measurement of the time of operation of relays, circuit breakers, sound locaters, and many other operations involving short time intervals from which an electrical impulse can be obtained at the beginning and end of the interval.

The basic requirements of any measuring instrument are accuracy, ease of operation, portability and other related merits. For velocities over short ranges and for barrel time with times between 0.002 and 0.040 second, the accuracy of the conventional Boulenge chronograph, for example, is not all that is desired. This invention has as one of its objects the development of an accurate instrument for measuring short time intervals and to provide a chronoscope which is portable, direct reading and adaptable to the accurate measurements of time intervals. Another object of this invention is to provide an indicating device which may be readily calibrated so as to be direct reading. The deflection of the ballistic galvanometer in this invention bears a direct relation to time. The invention contained herein constitutes an improvement over the invention disclosed in application Serial No. 276,167, filed May 27, 1939. From the following illustrative description, in which are disclosed certain embodiments of the invention, as well as details and means for carrying it out, it will become apparent how the foregoing and other objects may be accomplished.

Essentially, the chronoscope disclosed herein consists of two gaseous discharge tubes which are normally non-conducting, with a ballistic galvanometer in the plate-cathode circuit of one of the tubes. A suitable impulse is used to change the potential of the control electrode of the first tube, which renders the tube conducting and causes a flow of current through the ballistic galvanometer which is in its plate-cathode circuit. A suitable impulse at the end of the interval to be measured is used to change the potential upon the grid of the second tube, causing it to become conducting. As a result of the flow of current through the plate cathode circuit of the second tube from a source of energy, such as a battery therein, the plate potential of the first tube is so depressed relative to the cathode thereof as to cause the first tube to become non-conducting, thereby stopping the flow of current through the ballistic galvanometer.

Figure 1:
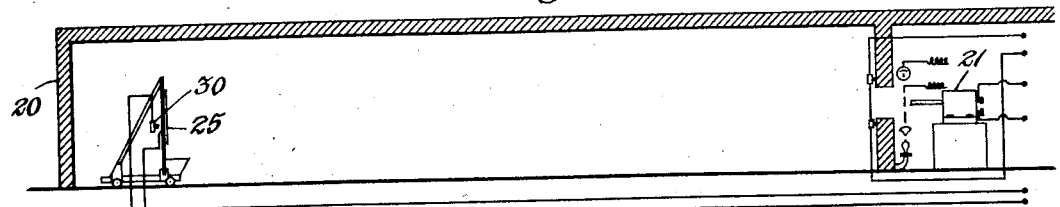
Fig. 1 is a schematic drawing of a ballistic range, which shows several devices for indicating the time at which a projectile is at particular points of its flight.

Referring to Fig. 1, there is shown, merely by way of example, one manner of using the invention wherein 20 indicates the walls and roof of a ballistic range. In the firing chamber, there may be located a breech mechanism 21 which may be fastened in any suitable manner to a firm foundation. At the other end of the range there is located a target plate 25, against which a projectile fired from the barrel may be directed. There may be a disjunctor contact 30 of conventional design located back of the target plate. There may also be provided some suitable means at the muzzle of the gun or responsive to the fall of the hammer upon the primer of the projectile to provide a suitable impulse to indicate the starting of the projectile in its flight. The bullet striking target plate 25 will cause the contact 30 mounted on the pendulum to be moved away from the plate 25, thereby breaking contact and causing an impulse of some description. The details of the ballistic range are well-known and are not a part of this invention. It is evident that many various forms and devices may be used to provide the impulses to indicate the beginning and end of the interval to be measured. Such impulses may cause either a making or breaking of a circuit.

The general equations for a ballistic galvanometer show that the angle of deflection $\theta$ is directly proportional to the quantity of electricity, Q passing through the instrument, the equation being $$\theta = kQ$$

wherein $k$ indicates the instrument's constants. When a galvanometer is used to indicate a time interval, for example as a chronoscope, a circuit is closed at the beginning of the time interval to be measured, allowing the current I to flow through the galvanometer. At the end of the time interval to be measured, the circuit is opened. It is evident that during the interval T that the current flows, the equation $$Q = IT$$

will express the relation existent, and that the galvanometer deflection will be $$\theta = kIT$$

The time interval can then be determined, if $k$ and I are known, because $$T = \frac{\theta}{kI}$$

The constant $k$ can be readily determined, because if a condenser of capacity $C_c$ is charged to a potential V, the charge will equal $C_cV$, or $$Q = C_cV$$

Then if the condenser be discharged through the galvanometer and the deflection D observed, it will follow that $$D = kC_cV \text{ or } k = \frac{D}{C_cV}$$

The circuits for determining the constant $k$ will be set forth at a later point. The current I can be determined by a steady state measurement, using a resistance that is the equivalent of the galvanometer resistance. Then, since $$T = \frac{\theta}{kI}$$

and $$k = \frac{D}{C_cV}$$

then $$T = \theta \frac{C_cV}{ID}$$

By letting $$\frac{C_cV}{ID} = K$$

there may be obtained the multiplying factor to convert $\theta$ into time T. It is evident that it would be convenient for K to equal some integer, and in order to secure this result, a suitable variable resistance may be inserted in the circuit. The current I can be adjusted to the desired value of $$I = \frac{C_cV}{KD}$$

and in this way the range of the instrument may be varied over wide limits.

Operation

Figure 2:
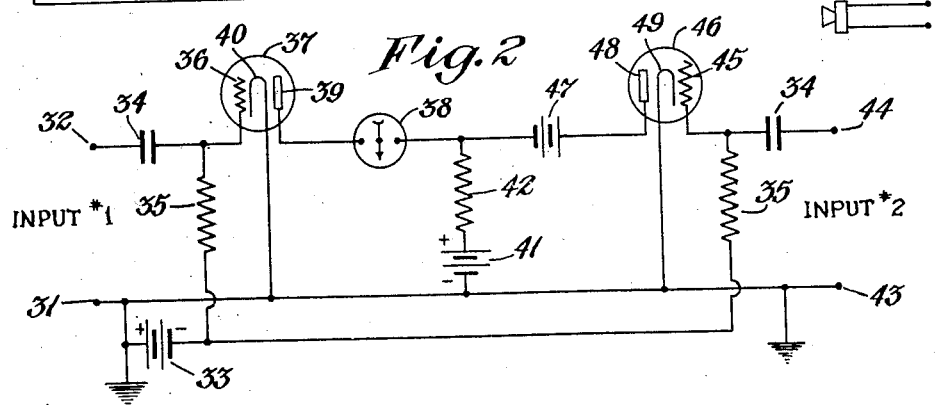
Fig. 2 is a simplified circuit arrangement, showing one way in which the invention may be carried out.

Fig. 2 shows a simplified circuit which may be utilized to practice the invention disclosed herein. The circuit of Fig. 2 is shown without the means for producing the impulse received at the beginning of the initial time interval, and such will be discussed at a later point. It is sufficient that the input terminals 31 and 32 are connected to a switch which may be closed in the example shown, to produce the desired impulse upon the first gaseous discharge tube. It is to be understood that the discharge tubes may be of the gaseous or vapor type, sometimes known as "thyratons," although not limited to the precise form shown. In such a gaseous or vapor tube, the grid or control electrode, as it becomes more positive, will finally reach the critical point where the tube will become conducting. The control grid then loses control of the tube and will not serve to stop the tube in its conduction. In order for the tube to remain conducting, it is necessary that the plate be kept above a certain potential. When a plate is depressed relative to a cathode below this potential, the tube will become non-conducting. The closing of the circuit 31 and 32 causes a current to flow from the battery 33 to one side of condenser 34 and through resistance 35 back to the battery. This will cause the grid 36 to change its potential and become more positive, thereby causing tube 37 to become conducting. A ballistic galvanometer 38 is located in the circuit, including the plate 39, cathode 40, battery 41 and resistance 42, so that a steady current will flow through the tube and galvanometer for a given time. It has been shown that the galvanometer will measure the quantity flowing therethrough, which will be the amount flowing from the time tube 37 becomes conducting to the time at the end of the interval when it becomes again non-conducting. A second impulse received at terminals 43 and 44 will similarly affect the grid 45 of gaseous discharge tube 46, and establish a flow of current from battery 47 to plate 48, cathode 49, through battery 41, resistance 42, and back to battery 47. In the manner about to be described, this flow of current which occurs when tube 46 becomes conducting, will depress the plate potential on plate 39 of tube 37 so as to render the tube 37 non-conducting. The anode, or plate voltage on tube 37 may be expressed by the equation $E_{37c} = E_{41} - IR_{42}$, $IR_{42}$ being the potential drop across resistance 42. The anode voltage on tube 37 during extinction at the moment the tube 46 becomes conducting, allowing the discharge of battery 47 therethrough is $$E_{27x} = (E_{41} - IR_{42}) - I_{47}R_{42}$$

where $I_{47}$ is the current of battery 47, which also passes through resistance 42. Previous to this, tube 37 remained conducting because the potential drop across resistance 42 with the current from battery 41 was not sufficient to depress the plate potential to the point where tube 37 would become non-conducting. However, the additional flow of current through 42, caused by the flow of current from battery 47, will lower the plate potential 39 below the critical value necessary for the tube to remain conducting. This may be expressed as $$E_{37x} = E_{37c} - I_{47}R_{42}$$

the term $I_{47}R_{42}$ being a potential which depresses the anode of the tube 37 to such a point as to be below the critical value and cause the tube to become non-conducting. It is seen, therefore, that as the current has stopped flowing through the galvanometer 38, that the quantity which has passed therethrough will give a direct reading of the interval between the time that tube 37 became conducting and tube 46 became conducting.

It is also to be understood that the tubes shown are for illustration only, and that multi-grid or other element tubes may be used.

By the invention described herein, the switch which is responsive to the beginning or end of the time interval to be measured may open or close the input circuits.

Figure 3:
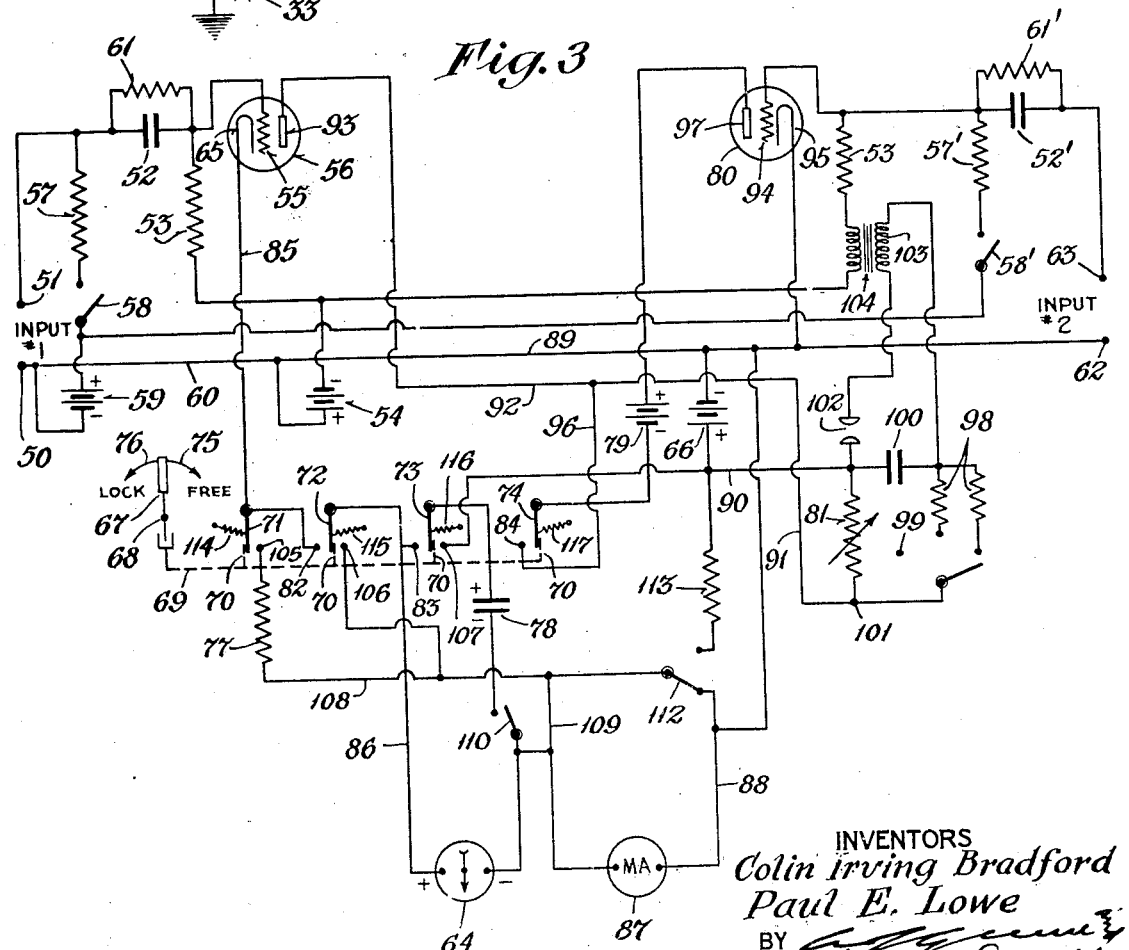
Fig. 3 is a circuit arrangement embodying the invention of the circuit of Fig. 2, and having means to determine the constants of the galvanometer, and also including a protective circuit.

Referring particularly to Fig. 3, 50 and 51 may be the terminals corresponding to 31 and 32 of Fig. 2. A condenser 52, resistance 53 and battery 54 are provided, which are similar to condenser 34, resistance 35 and battery 33 of Fig. 2. The charging of condenser 52 from battery 54 will serve to apply a positive potential to grid 55 of tube 56. Resistance 57, switch 58, and battery 59 are connected across the input terminals. If it is desired to use a switch or device that closes at the beginning of the interval to be measured, the switch 58 is left in its open position, as shown in Fig. 3. The circuit will then be closed from battery 54, terminal 50 through the switch (not shown), terminal 51, condenser 52, resistance 53, back to battery 54. This will apply a positive potential to grid 55. If it is desired to use a switch between 50 and 51 that opens upon the change of condition at the beginning of the interval to be measured, the switch 58 is closed and, when the impulse responsive switch is opened, the potential of battery 59 will appear upon the plate of condenser 52, the flow being from battery 59, switch 58, resistance 57, condenser 52, resistance 53, battery 54, line 60, and back to battery 59. It is seen, therefore, that either the opening or closing of a switch, responsive to the beginning of an interval, connecting input terminals 50 and 51 together will cause a positive potential or change in potential upon the grid 55, sufficient to render the gaseous discharge tube 56 conducting. A leak-off 61 of high resistance may be connected across the plates of condenser 52, which will allow the charge thereon to slowly leak off so that the circuit will be in readiness for the next impulse to be received at the next operation. A similar arrangement may be employed for the input terminals 62 and 63 for the impulse to be received as a result of a change in condition at the end of the interval to be measured.

The circuit shown in Fig. 3 essentially contains the circuit of Fig. 2 with a few changes, and, in addition, has means for calibrating the galvanometer and for determining its constants and a protective circuit to operate the second tube in the event that a second impulse is not received. A galvanometer 64 corresponding to 38 of Fig. 2 is located in the plate-cathode circuit of tube 56 instead of being directly in the connection between the plates of the two tubes. The galvanometer 64 is located between the cathode 65 and the negative side of battery 66. Battery 66 corresponds to battery 41 of Fig. 2. A switch operating handle 67 of conventional type, which is pivoted at 68, may be employed to reciprocate the operating bar 69. It is to be understood that the switch shown in Fig. 3 is diagrammatic in form and may take any of a different number of forms. For the purpose of illustration, the bar 69 has the projections 70 thereon for the purpose of operating the switch levers 71, 72, 73 and 74 in a manner which will be described presently. When it is desired to take a reading with the instrument, the switch operator 67 is moved to the right in the direction indicated by arrow 75, which moves the operating bar 69 to the left. The springs 114, 115, 116, 117 are employed to urge the switch levers 71, 72, 73, 74 in the direction of said springs. After the reading has been taken, the removal of pressure upon operator 67 will allow the switch to return to the neutral position shown in Fig. 3. If it is desired to calibrate the instrument, the switch is moved in the direction shown by arrow 76 where it may be locked so that the proper readings may be taken. A resistance 77 which is the equivalent of the resistance of the galvanometer 64 may be provided. A condenser 78 which has a capacity such that it may be charged with a current of a known value and potential and then allowed to discharge through the galvanometer 64 is also provided. The battery 79 is placed in the plate cathode circuit of the second gaseous discharge tube 80 and is similar to the battery 47 of Fig. 2. The resistance 81 corresponds to the resistance 42 of Fig. 2. Resistance 81 may be variable so that the range of the instrument can be changed.

A description will first be given of the setting of the apparatus for the taking of a reading, following which a description of the calibration circuits and protective circuits will be given. In order to take a reading, the switch operator 67 is moved in the direction indicated by 75, which will move the operating bar 69 to the left and close switch lever 72 upon contact 82, switch lever 73 upon contact 83, and switch lever 74 upon contact 84. When in this position, an impulse placing a positive potential upon condenser 52 in a manner which has previously been described will cause gaseous discharge tube 56 to become conducting. A current will then flow in the plate cathode circuit of said tube from cathode 65, line 85, contact 82, switch blade 72, line 86, galvanometer 64, milliammeter 87, line 88, line 89, to the negative side of battery 66, line 90, through variable resistance 81, line 91, line 92, back to the plate 93 of tube 56. This is similar to the plate-cathode circuit of tube 37 (Fig. 2) with the exception that the galvanometer is on the opposite side of the resistance 42 and battery 41. The ballistic galvanometer will deflect in accordance with the quantity of current flowing therethrough, which will depend upon the length of time that tube 56 remains conducting. An impulse received at input terminals 62 and 63, indicating the end of the interval to be measured, places a positive charge upon condenser 52' and changes the potential of the grid 94 of tube 80. Tube 80 will thereupon become conducting and the plate-cathode circuit thereof may be traced from cathode 95, line 89, negative side of battery 66, line 90, resistance 81, line 91, line 96, contact 84, switch lever 74, battery 79, back to the plate 97 of tube 80. The additional current from the plate-cathode circuit of tube 80 through resistance 81 will cause a drop in the potential of the plate side of tube 56, such that the plate potential of tube 56 will fall below the critical value necessary for this tube to remain conducting, and tube 56 will thereupon become non-conducting, interrupting the flow of current through galvanometer 64. Thus it is seen that the tube 56, upon becoming conducting, will start a flow through galvanometer 64 which will be stopped upon an impulse being received by tube 80, which starts tube 80 to become conducting. After this reading has been made, if the operator releases the switch 67, the switch will return to the neutral position and will break the circuit between contact 84 and switch lever 74, thereby breaking the plate-cathode circuit of tube 80 so that the tube will again become non-conducting. It is evident that when the impulse is received by the second tube 80 that it will extinguish the first tube 56, which will then remain extinguished until the plate-cathode circuit of the second tube is broken by the switch 67 returning to neutral position. In this manner, a second impulse or impulse due to chattering of the switch connected to input #1 of the first tube will not serve to actuate the instrument a second time, thereby giving a false reading or injuring the galvanometer. This is in addition to the protective circuit which will now be described.

The protective circuit is similar to that shown in the application Serial No. 276,167, and includes means to impress an impulse upon the grid of tube 80 after a given period of time in the event that an impulse is not received at terminals 62 and 63. A variable resistance, such as that shown at 98, may be employed so that the device may be set for any given desired interval, this being necessary so that the interval may be adjusted, so that the second tube will not be shut off before the end of the interval to be measured, and that the protective circuit will only operate after a given set time thereafter. A dead point or terminal 99 is provided for the resistance adjusting means, so that the calibration operations may be made without the protective circuit operating to interfere. At the time that the first tube 56 becomes conducting, the protective condenser 100 is charged from point 101 through one of the resistances 98. A discharge device 102 is connected in series with the secondary 103 of a protective transformer 104, the device 102 and secondary 103 being parallel to the protective condenser 100. The discharge device 102 may be of any suitable type, such as a neon tube wherein a potential of sufficient value will render the tube conducting or cause the device to become conducting. It is seen that as the current flows through resistance 81 as the tube 56 becomes conducting, that protective condenser 100 will be charged. When the charge reaches a certain value, the discharge device 102 will break down, allowing an impulse to flow through the secondary of the transformer 104, which will place an impulse upon the grid 94 of tube 80. This will have the same effect on the tube 56 as though an impulse has been received at input terminals 62 and 63 and will shut off the tube 56, thereby preventing the device from operating after a given interval even though no impulse has been received at terminals 62 and 63.

The means for calibrating the instrument will now be described. Switch operator 67 is moved in the direction indicated by arrows 76, whereupon it may be locked by any suitable means. This will cause switch 71 to close upon contact 105, switch 72 to close upon contact 106, and switch 73 to close upon contact 107, and will allow switch 74 to remain open. In order to obtain the steady state current readings, it is necessary to ascertain the value of the current I flowing through the galvanometer. The tube 56 is started by any desired means. The circuit may be traced from cathode 65, line 85, switch lever 71, contact 105, resistance 77 (equivalent to resistance of galvanometer), line 108, line 109, milliammeter 87, line 88, battery 66, line 90, resistance 81, line 91, line 92, plate 93. As the resistance 77 is the equivalent of the galvanometer 64, the milliammeter 87 will give a reading of the current which will flow through the circuit when tube 56 becomes conducting.

In order to determine the deflection constant of the galvanometer, it is necessary to charge condenser 78 and then to discharge condenser 78 through the galvanometer so that a reading thereof may be obtained. The switch 110 is closed and the condenser 78 will be charged from battery 66 by a circuit that may be traced from the + plate of condenser through switch lever 73, contact 107, to the + side of battery 66, line 89, line 88, milliammeter 87, switch lever 110, back to the − plate of condenser 78. Then the condenser 78 may be discharged through the galvanometer 64 by moving switch 67 to the right so that contact will be made by the switch lever 73 and point 83. When this is done, current will flow from the + side of condenser 78, through switch lever 73, point 83, line 86, galvanometer 64, switch 110, back to the − side of condenser 78. The voltage or potential of battery 66 may be determined by closing switch 112 to resistance 113 whereupon the circuit may be traced as follows: + side of battery 66, resistance 113, line 109, milliammeter 87, line 88, line 89, back to battery 66. The resistance 113 is of such a value as to cause 87 to function as a voltmeter. From these readings, constants of the galvanometer can be determined because the capacity of condenser 78 is known and deflection D has been observed. All this has been set out in detail in application Serial No. 276,167.

It is seen that in the improvement of this invention that a source of energy, such as a battery, has been substituted for a source of energy, such as a condenser, to be used to depress the plate potential of a gaseous discharge tube that has been rendered conducting at the beginning of an interval to be measured. There has also been provided a means to so connect the input terminals of the discharge tubes that the switch used to close the input circuit so as to cause the first tube to become conducting may be one that can be either opened or closed. It is to be understood that the discharge tubes shown are merely for purposes of illustration and may take other forms, and that the uses of the words "plate," "cathode," or "grid" are to be broadly construed and not limited to that shown. It is also to be understood that the tubes may be reversed from the position shown, and the cathodes connected together instead of the plates.

This invention is not limited to the details described and illustrated, but is to be construed as covering all equivalent devices falling within the scope of the appended claims.

What is claimed is:

1. In an impulse responsive device, the combination of two normally non-conducting gaseous discharge tubes, each tube including a plate, cathode and control grid; a plate-cathode circuit for the first of said tubes, said circuit including the plate and cathode of the first tube, a source of energy, a resistance and a ballistic galvanometer directly in said circuit; a plate-cathode circuit for the second tube including the plate and cathode of the second tube, a second source of energy and said resistance; means to normally bias the control grids of said tubes to maintain the tubes in non-conducting condition; means to impress an impulse on the first control grid to render the tube conducting, thereby causing a flow of current through the ballistic galvanometer; means to impress an impulse on the control grid of the second tube to render the same conducting, the additional flow of current through the resistance from the plate-cathode circuit of the second tube depressing the plate potential of the first tube to render the same again non-conducting.

2. In an impulse responsive device, the combination of two normally non-conducting gaseous discharge tubes, each tube including a plate, cathode and control grid; a plate-cathode circuit for the first of said tubes, said circuit including the plate and cathode of the first tube, a source of energy, a resistance and a ballistic galvanometer in series; a plate-cathode circuit for the second tube including the plate and cathode of the second tube, a battery and said first resistance; means to normally bias the control grids of said tubes to maintain the tubes in non-conducting condition; means to impress an impulse on the first control grid to render the tube conducting; means to impress an impulse on the control grid of the second tube to render the same conducting and to cause said battery current to flow through said resistance in addition to the first tube flow and thereby depress the plate potential of the first tube to render the same again non-conducting.

3. In an impulse responsive means, a normally non-conducting gaseous discharge tube, including a plate, cathode, control grid and a plate-cathode circuit including said plate and cathode, and a source of energy; means to bias the control grid relative to ground comprising a biasing source of energy connected between said grid and ground to maintain the tube normally non-conducting; means for changing the bias to render the tube conducting, said means comprising a circuit including a source of energy and a switch connected between said grid and ground in parallel with the first circuit; and a switch responsive to an impulse connected between said grid and ground so that with the first mentioned switch open, a closing movement of the second mentioned switch will change the potential on the grid, and with the first mentioned switch closed, an opening movement of the second mentioned switch will change the potential on the grid.

4. In an impulse responsive device, the combination comprising two normally non-conducting gaseous discharge tubes, each tube having a plate, cathode and control grid; means to normally bias the control grids of said tubes below that required for conduction; means to change the bias on the first tube responsive to an impulse to render it conducting; means to change the bias on the second tube responsive to a second impulse to render the same conducting; a plate-cathode circuit for the first tube including its plate, cathode and a source of energy; a plate-cathode circuit for the second tube including its plate and cathode, and a source of energy; means in the second plate-cathode circuit connected to the first plate-cathode circuit to depress the plate potential of the first tube below that required for conduction when current flows through the second plate-cathode circuit; the source of energy in the second circuit providing a current flow until positively interrupted to prevent further impulses on the first tube from rendering the first tube again conducting; and means to measure the time of current flow in the first plate-cathode circuit.

5. In an impulse responsive device, a normally non-conducting gaseous discharge tube including a plate, cathode, control grid, and a plate-cathode circuit including said plate and cathode and a source of energy; input terminals for the device, one of said terminals being connected to said control grid by a grid input lead through a condenser having a leak-off resistance in parallel therewith; means to bias the control grid relative to ground comprising a second circuit including a biasing source of energy connected between said grid and ground to maintain the tube normally non-conducting; means for changing the bias to render the tube conducting comprising a third circuit including a source of energy and a switch connected between said grid and ground in parallel with said second circuit, said condenser being located in the grid input lead between said second and third circuits; and a switch responsive to an impulse connected between said grid and ground so that with the first mentioned switch open, a closing movement of the second mentioned switch will change the potential on the grid, and with the first mentioned switch closed, an opening movement of the second mentioned switch will change the potential on the grid.

COLIN IRVING BRADFORD.
PAUL E. LOWE.